United States Patent
Fink et al.

(10) Patent No.: US 9,875,230 B2
(45) Date of Patent: Jan. 23, 2018

(54) TEXT ANALYSIS ON UNSTRUCTURED TEXT TO IDENTIFY A HIGH LEVEL OF INTENSITY OF NEGATIVE THOUGHTS OR BELIEFS

(71) Applicant: International Business Machines Corporation, Armonk, NY (US)

(72) Inventors: Patrick W. Fink, Charlotte, NC (US); Kristin E. McNeil, Charlotte, NC (US); Philip E. Parker, York, SC (US); David B. Werts, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 15/094,352

(22) Filed: Apr. 8, 2016

(65) Prior Publication Data
US 2017/0293605 A1 Oct. 12, 2017

(51) Int. Cl.
*G06F 17/27* (2006.01)

(52) U.S. Cl.
CPC ...... *G06F 17/2705* (2013.01); *G06F 17/2785* (2013.01)

(58) Field of Classification Search
CPC ...... G01C 21/3682; G06F 2203/04805; G06Q 30/02; G06T 3/0018; G09G 5/14
USPC ........... 704/9; 706/11, 12, 14; 707/738, 736, 707/728, 741; 705/14.4, 14.42, 14.52, 705/14.71
See application file for complete search history.

(56) References Cited

U.S. PATENT DOCUMENTS

| | | | |
|---|---|---|---|
| 7,283,962 B2 | 10/2007 | Meyerhoff et al. | |
| 7,523,085 B2 | 4/2009 | Nigam et al. | |
| 7,603,268 B2 | 10/2009 | Volcani et al. | |
| 8,296,130 B2 | 10/2012 | Spears | |
| 8,463,594 B2 | 6/2013 | Au | |
| 8,670,526 B2 | 3/2014 | Clawson | |

(Continued)

FOREIGN PATENT DOCUMENTS

WO 2015053607 A1 4/2015

OTHER PUBLICATIONS

Ozgul et al.; "Mining Hate Crimes to Figure Out Reasons Behind", ASONAM, 2012 IEEE/ACM International Conference on, Aug. 26-29, 2012, pp. 887-889.

(Continued)

*Primary Examiner* — Charlotte M Baker
(74) *Attorney, Agent, or Firm* — Ryan Lewis; Edell, Shapiro & Finnan, LLC (57) ABSTRACT

A method, a processing device, and a computer program product are provided. Via at least one processing device, each text file is selected from a collection of text files, wherein the collection of text files has an intensity with respect to negative sentiment toward a common issue. At least one profile algorithm is performed, each calculating a corresponding profile score for that text file. At least one corresponding profile score of the text files of the collection are combined to produce an aggregated profile score for each of at least one profile algorithm. The aggregated profile score of each of the at least one profile algorithm for the collection is stored. A signature for the collection of text files includes the aggregated profile score of each of the at least one profile algorithm for the collection.

17 Claims, 5 Drawing Sheets

(56) References Cited

U.S. PATENT DOCUMENTS

| | | | |
|---|---|---|---|
| 8,793,252 B2* | 7/2014 | Subasic | G06F 17/3071 |
| | | | 705/14.4 |
| 9,134,215 B1 | 9/2015 | Vignisson et al. | |
| 2011/0258034 A1* | 10/2011 | Metzler | G06Q 30/0275 |
| | | | 705/14.42 |
| 2013/0263019 A1 | 10/2013 | Castellanos et al. | |
| 2014/0164036 A1 | 6/2014 | Prieto | |
| 2014/0344191 A1* | 11/2014 | Lebow | G06N 5/02 |
| | | | 706/11 |
| 2015/0058957 A1 | 2/2015 | Halliday et al. | |
| 2015/0106155 A1 | 4/2015 | Castellanos et al. | |
| 2015/0286627 A1 | 10/2015 | Chang et al. | |
| 2015/0319119 A1 | 11/2015 | Ryu et al. | |

OTHER PUBLICATIONS

IP.com et al.; "A System for Extracting and Analyzing Tags and Sentiment Scores From Unstructured Text", IPCOM000205102D, Mar. 15, 2011, pp. 1-5.

Williams et al.; "Cyberhate on Social Media in the Aftermath of Woolwich: A Case . . . Big Data", Bristish Journal of Criminology Advance Access, Jun. 25, 2015, pp. 1-28.

* cited by examiner

ENTER ACTIONS TO BE PERFORMED WHEN
SIGNATURE DISTANCE IS WITHIN
THRESHOLD OF COLLECTION SIGNATURE
- CONTACT LOCAL POLICE
- SEND EMAIL
- SEND TEXT MESSAGE
- CALL PHONE NUMBER

FIG. 6

ENTER ACTIONS TO BE PERFORMED WHEN
SIGNATURE DISTANCE IS WITHIN
THRESHOLD OF COLLECTION SIGNATURE
- CONTACT LOCAL POLICE
- SEND EMAIL
-     ENTER ONE OR MORE EMAIL ADDRESSES SEPARATED BY ";"
- ______________________
- SEND TEXT MESSAGE
- CALL PHONE NUMBER

FIG. 7

ENTER ACTIONS TO BE PERFORMED WHEN
SIGNATURE DISTANCE IS WITHIN
THRESHOLD OF COLLECTION SIGNATURE
- CONTACT LOCAL POLICE
- SEND EMAIL
- SEND TEXT MESSAGE
-     ENTER NUMBER(S) TO SEND MESSAGE TO SEPARATED BY ";"
- ______________________
- CALL PHONE NUMBER

FIG.8

ENTER ACTIONS TO BE PERFORMED WHEN
SIGNATURE DISTANCE IS WITHIN
THRESHOLD OF COLLECTION SIGNATURE
- CONTACT LOCAL POLICE
- SEND EMAIL
- SEND TEXT MESSAGE
- CALL PHONE NUMBER
- ENTER PHONE NUMBER(S) TO CALL SEPARATED BY ","
- ______________________________

TEXT ANALYSIS ON UNSTRUCTURED TEXT TO IDENTIFY A HIGH LEVEL OF INTENSITY OF NEGATIVE THOUGHTS OR BELIEFS

BACKGROUND

Present invention embodiments are related to systems and methods for analyzing unstructured text to identify a high level of intensity of negative sentiment, thoughts or beliefs. In particular, present invention embodiments are related to performing training on collections of text files, each of the collections being authored by a respective author and having a respective level of intensity of negative thoughts or negative beliefs, to produce at least one aggregated score and comparing the at least one aggregated score to at least one profile score of a text file for analysis to determine a collection that is closest to the text file for analysis.

Often, after an occurrence of a negative event, information authored by an initiator of the negative event is found on a computer network such as, for example, the Internet or other network, that, in hindsight, appear to be obvious clues that the negative event was about to happen. For example, after an occurrence of several recent negative events, postings on websites were found that were authored by initiators of the negative events and would lead one to believe that the recent negative events were about to occur. Since these clues are not truly discovered, no intervention is initiated to prevent negative events.

SUMMARY

According to embodiments of the present invention, a computer-implemented method, a processing device, and a computer program product are provided. Embodiments may be implemented by at least one processing device. Each text file from a collection of text files may be selected via at least one processing device. The collection of text files have an intensity with respect to negative sentiment toward a common issue. At least one profile algorithm is performed, each calculating a corresponding profile score for that text file. At least one corresponding profile score of the text files of the collection are combined to produce an aggregated profile score for each of at least one profile algorithm for the collection. The aggregated profile score of each of the at least one profile algorithm for the collection may then be stored. A signature for the collection of text files includes the aggregated profile score for each of the at least one profile algorithm for the collection.

In another aspect of the embodiments of the present invention, a desired text file may be selected for analysis. At least one profile algorithm may be performed, with respect to the desired text file, to calculate a corresponding profile score for each profile algorithm. The profile score for the at least one profile algorithm may be stored. Signatures of each of the collection of text files may be compared to a signature of a desired text file. The signature of the desired text file includes the profile scores, with respect to the desired text file, for each of the profile algorithms. An indication of collections having signatures within a threshold distance of the signature of the desired text file may be provided, and a user configurable action may be performed when at least one collection has a signature within the threshold distance of the desired text file.

BRIEF DESCRIPTION OF THE DRAWINGS

Generally, like reference numerals in the various figures are utilized to designate like components.

DETAILED DESCRIPTION

Figure 1:
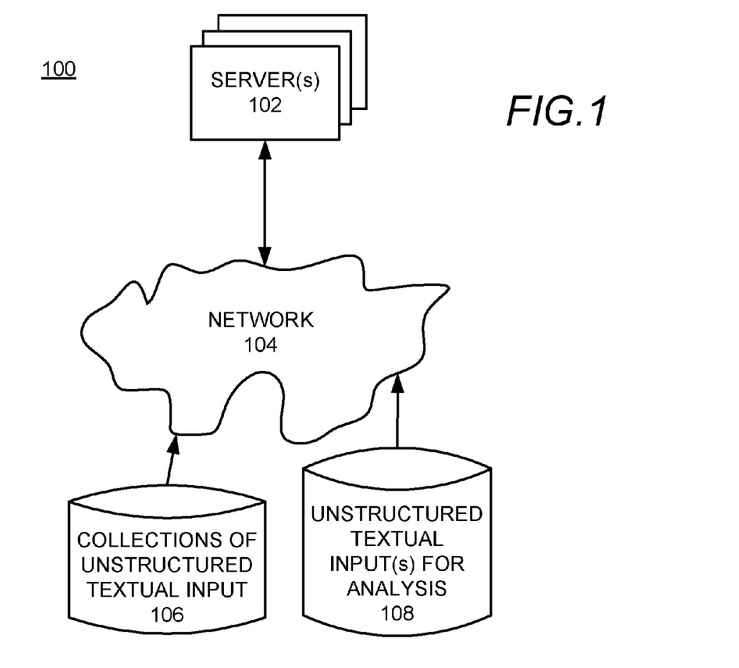
FIG. 1 illustrates an example environment in which various embodiments may be implemented.

With reference now to FIG. 1, an example environment 100 for implementation of embodiments is shown. Example environment 100 may include one or more servers 102, a network 104, and one or more databases, which may include collections of unstructured textual input 106 and one or more textual inputs for analysis 108. Although FIG. 1 shows two databases, other embodiments may include collections of unstructured textual input and one or more textual inputs for analysis in a single database or this data may be included in a different number of databases.

Network 104 may be implemented by any number of any suitable communications media (e.g., wide area network (WAN), local area network (LAN), Internet, Intranet, etc.). In some embodiments, server(s) 102, collections of textual input 106 and one or more textual inputs for analysis 108 may be local to each other and may communicate with each other via any appropriate local communication medium (e.g., local area network (LAN), hardwire, wireless link, Intranet, etc.). In other embodiments, server(s) 102, collections of textual input 106 and one or more textual inputs for analysis 108 may be remotely located from each other and may communicate with each other via a WAN, Internet, etc.

In a training phase, one or more server(s) 102 may have access to collections of textual input 106, each of which may be authored by a different respective author. Within each of the collections, each text file has a same or similar level of intensity for negative sentiments, thoughts or beliefs with respect to a common issue and relative to common social standards and attitudes. One or more servers 102 may be trained, using multiple collections of textual input, each with a varying intensity level of negative sentiment to recognize each of multiple levels of the intensity.

After completion of the training phase, an unstructured textual input may be analyzed using a same group of algorithms that were used to train the one or more servers. The one or more servers may indicate a level of intensity of the analyzed textual input based on a distance between signatures of each of the collections with varying intensity levels and a signature of the analyzed text. In some embodiments, the distance may be a Euclidean distance.

Figure 2:
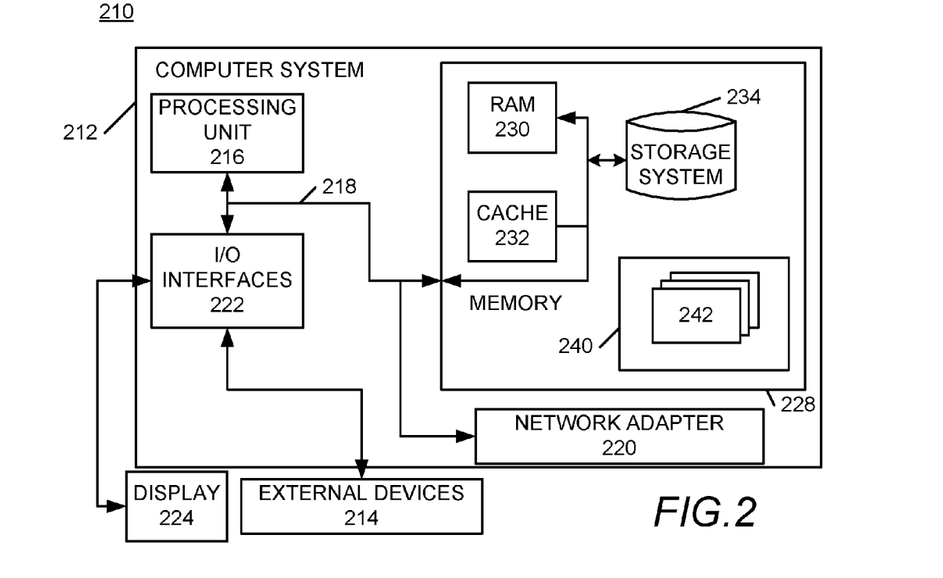
FIG. 2 shows an example processing device which may implement various embodiments.

Referring now to FIG. 2, a schematic of an example processing device 210 is shown, which may implement a server of server(s) 102. Processing device 210 is only one example of a suitable processing device for the environment of FIG. 1 and is not intended to suggest any limitation as to the scope of use or functionality of embodiments of the invention described herein. Regardless, processing device 210 is capable of being implemented and/or performing any of the functionality set forth herein.

In processing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types. Computer system 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system 212 is shown in the form of a general-purpose computing device. Components of computer system 212 may include, but are not limited to, one or more processors or processing units 216, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, and removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
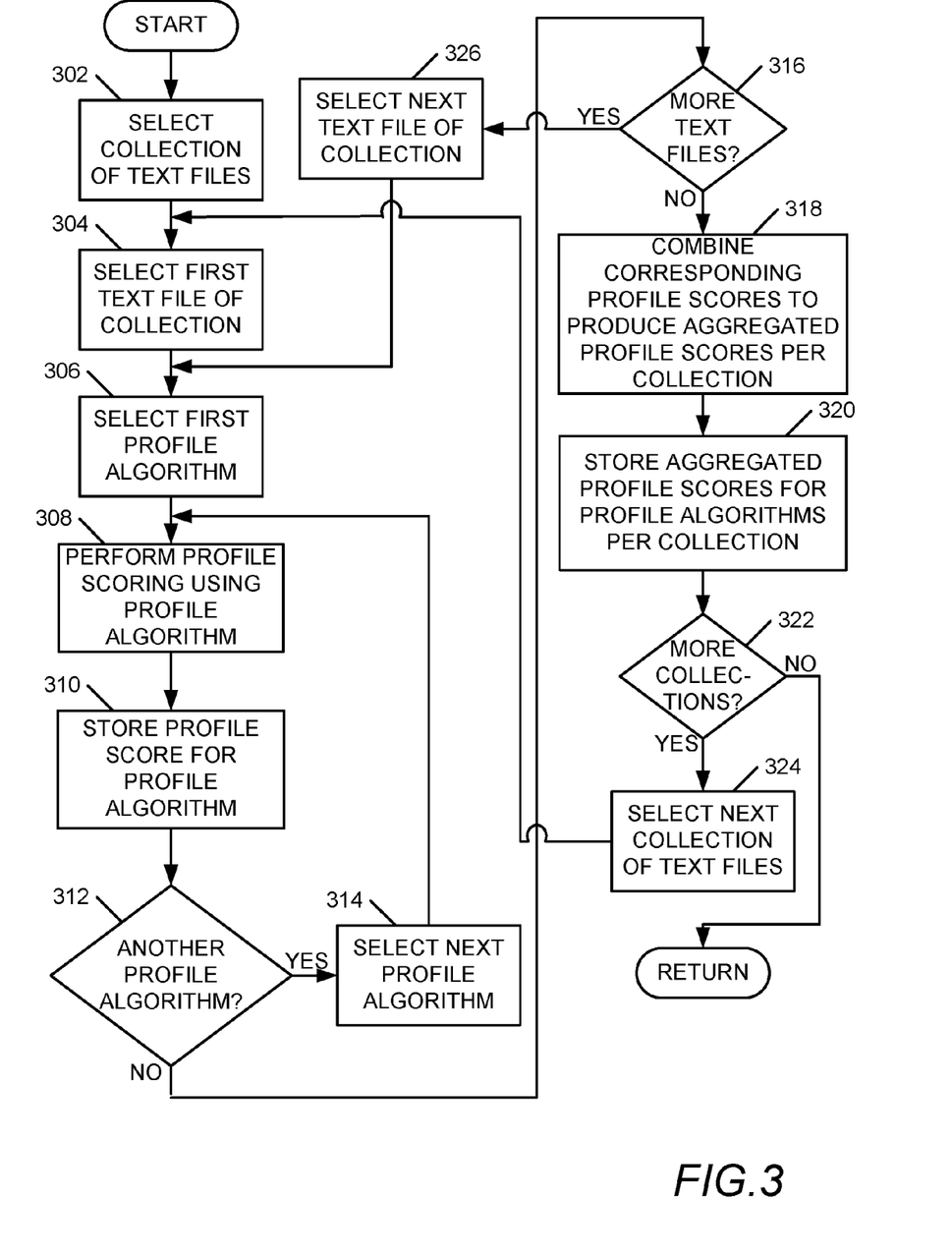
FIGS. 3 and 4 are flowcharts that illustrate example processing in various embodiments.

FIG. 3 is a flowchart that illustrates example processing in a training phase of an embodiment. The process may begin with one or more servers 102 selecting access to a collection of unstructured text files 106 (act 302), which may be local or remote from one or more servers 102. One or more servers 102 may then select a first unstructured text file of the selected collection of unstructured text files 106 (act 304). Each collection of unstructured text files may be authored by a same respective author and may have a same or similar respective level of intensity with respect to negative sentiments, thoughts, or beliefs for a common issue relative to common social standards and attitudes. Authors of the unstructured text files and the levels of intensity may vary from collection to collection. At least some of the authors, whose postings have a high level of intensity, are known to have initiated a negative event with undesirable impact in accordance with their expressed negative sentiments, thoughts or beliefs.

Returning to FIG. 3, a first profile algorithm may be selected (act 306). Each profile algorithm calculates a profile score for an unstructured text file being analyzed. In some embodiments, there may be a number of profile algorithms. The number of profile algorithms may include, but not be limited to, calculating a profile score based on: certain keywords appearing in the text; certain keywords and frequency of use of the keywords; certain keywords appearing in all uppercase characters; words appearing in a font color that is different from a font color used in most of the unstructured text file; appearance of multiple contiguous exclamation points; frequency of appearance of repeated phrases; etc.

One industry standard for context analytics, which may be used in various embodiments, is Unstructured Information Management Architecture (UIMA). UIMA is an architecture that includes software systems for analyzing large volumes of unstructured information in order to discover knowledge that is relevant to an end user. For example, a UIMA application may process text and identify entities, such as persons, places, organizations, or relations such as works-for or located-at. A UIMA pipeline is a list of individual stages, or annotators, which are run serially. When a document is processed by the UIMA pipeline, a first annotator stage may create annotations covering sections of text. When the first stage is completed, the second annotator stage may then process the text. Each subsequent stage may read annotations created by earlier stages and may add or modify the annotations, thus building up a more complex analysis of contents of the document. The annotations could be for an entire document, a paragraph or sentence, a token or an annotation that one can define by creating a custom dictionary or a parsing rule including, but not limited to, a city, particular keywords, punctuation and font color.

Returning to the flowchart of FIG. 3, profile scoring of the unstructured text file is performed according to the profile algorithm (act 308). One or more servers 102 may then store the profile score (e.g., quantity/frequency of . . . , etc.) for the profile algorithm (act 310). One or more servers 102 may determine whether another profile algorithm is to be performed with respect to the unstructured text file (act 312). If so, then a next profile algorithm may be selected (act 314) and acts 308-312 may be repeated.

If, during act 312, a determination is made that no additional profile algorithms are to be performed then a determination is made regarding whether there are additional unstructured text files within the collection (act 316). If there are additional unstructured text files within the collection, then a next unstructured text file of the collection may be selected (act 326) and acts 306-316 may be repeated.

If, during act 316, a determination is made that there are no more unstructured text files to process within the collection, then corresponding profile scores from the profile algorithms for each of the unstructured text files may be combined to produce corresponding aggregated profile scores per profile algorithm for the collection (act 318). In one embodiment, an aggregated profile score may be an average of corresponding profile scores, a mean value of corresponding profile scores, or another value based on the corresponding profile scores for a collection. The aggregated profile scores associated with each of the profile algorithms may be stored with respect to the collection (act 320). A collection of aggregated profile scores for each collection is a corresponding signature for a respective collection.

Next, one or more servers 102 may determine whether any additional collections of unstructured text files exist (act 322). If one or more additional collections exist, then one or more servers 102 may select a next collection of unstructured text files for processing (act 324) and acts 304-322 may be repeated.

If, during act 322, a determination is made that no additional collections remain to be processed, then the process may be complete.

Figure 4:
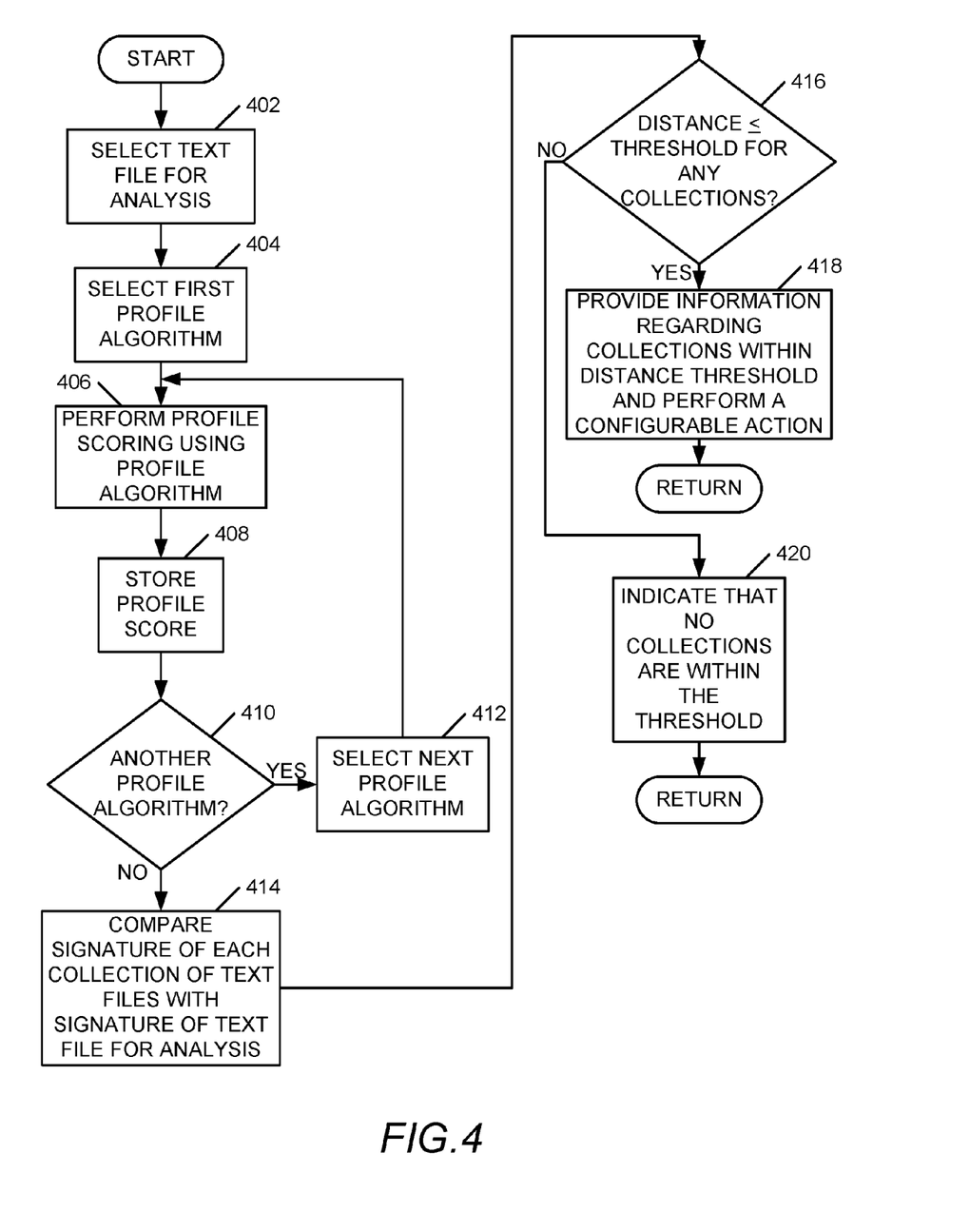

FIG. 4 is a flowchart that illustrates example processing with respect to unstructured text to be analyzed and categorized during a runtime phase. The process may begin with selecting an unstructured text file for analysis and categorization (act 402). Next one or more servers 102 may select a first profile algorithm for calculating a profile score of the selected unstructured text file (act 404). Any profile algorithms performed with respect to the selected unstructured text file were also used during the training phase to process the unstructured text files of the collections. One or more servers 102 may then calculate a profile score with respect to the selected unstructured text file (act 406). The profile score may then be stored with respect to the unstructured text file (act 408). One or more servers may then determine whether another profile algorithm is to be performed with respect to the unstructured text file (act 410). If another profile algorithm is to be performed, then a next profile algorithm may be selected and acts 406-410 may be repeated.

If, during act 410, a determination is made that there are no additional profile algorithms to perform, a signature of the unstructured text file is constructed from the profile scores calculated for corresponding profile algorithms performed with respect to the unstructured text file, and used for analysis and categorization. The signature of the unstructured text file may be compared to respective signatures of each of the collections processed during the training phase (act 414).

During the comparing, a distance may be calculated between the signature of the unstructured text file and the signature of each of the collections. A determination may be made regarding whether the calculated distance between the signature of the unstructured text file and any of the collections is less than or equal to a threshold, which may be configurable via a user interface such as, for example a graphical user interface (GUI) or other type of interface (act 416). If the calculated distance between the signature of the unstructured text file and the signature of any of the collections is less than or equal to the threshold, information may be provided regarding a collection or collections within the threshold and a configurable action may be performed (act 418). The information may be provided in any one of a number of ways including, but not limited to, being displayed on a display screen, printed on a printer, emailed or texted to a user, and being provided via a speaker.

If, during act 416, the calculated distance between the signature of the unstructured text file and the signature of each of the collections is not less than or equal to the threshold, then an indication may be provided regarding no collection being within the threshold of the signature of the unstructured text file.

In some embodiments, the calculated distance may be a Euclidean distance between the signature of a collection and the signature of the unstructured text file being analyzed and categorized. In Euclidean space, $\mathbb{R}^n$, Euclidean distance is defined as the square root of the sums of the squared differences of each of the corresponding profile scores, i.e. $\sqrt{\Sigma_{i=1}^{n}|P_i(\text{collection})-p_i(\text{unstructuredtext})|^2}$, where $P_i$(collection) is the $i^{th}$ aggregated profile score for a collection, $p_i$(unstructured text) is the $i^{th}$ profile score for the unstructured text to be analyzed and categorized and n is a number of profile algorithms.

As mentioned above, the user may configure one or more actions to be taken when a signature of one or more collections has a distance, with respect to a signature of an unstructured textual document, that is within the threshold distance. FIGS. 5-8 illustrate an exemplary user interface for configuring the one or more actions to be taken.

Figure 5:
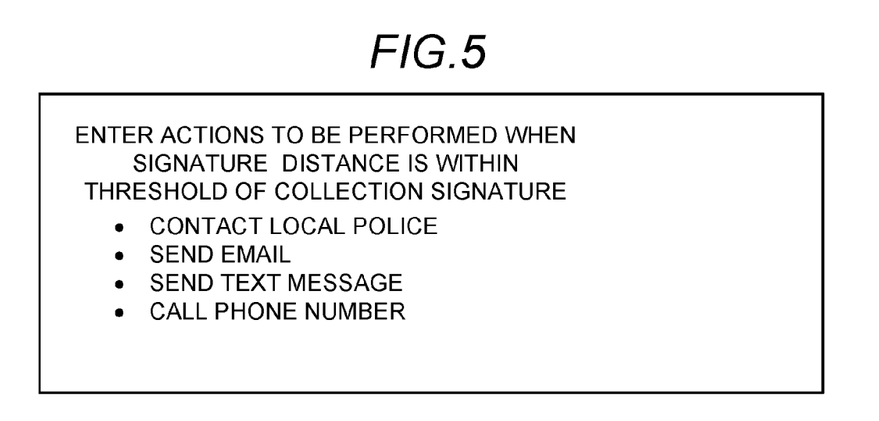
FIGS. 5-8 illustrate an example user interface for configuring an action to be taken when a signature of a desired text file has a distance within a threshold distance of a signature of at least one collection of unstructured text files.

FIG. 5 shows four example actions which the user may select to be taken when a signature of a collection is determined to be within a threshold distance of a signature of an unstructured text file being analyzed. The actions may include but not be limited to: contact local police; send email; send text message; and call phone number.

Figure 6:
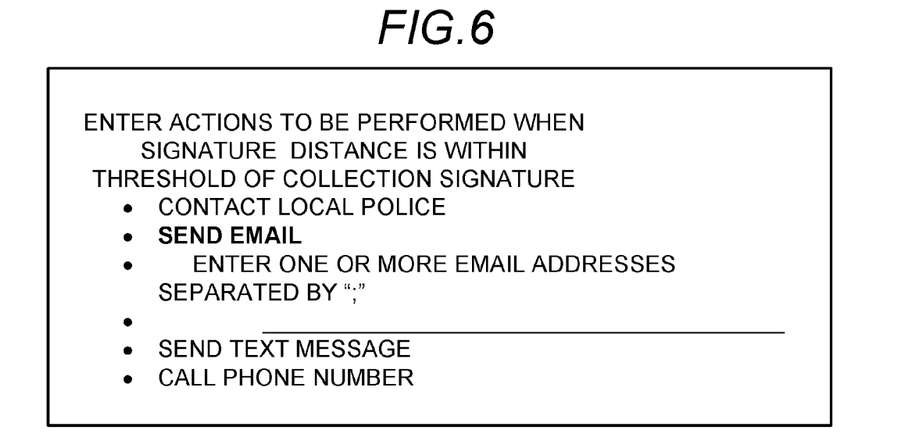

FIG. 6 shows that when the user selects "SEND EMAIL", the user is prompted to enter one or more email addresses. To which a message may be sent.

Figure 7:
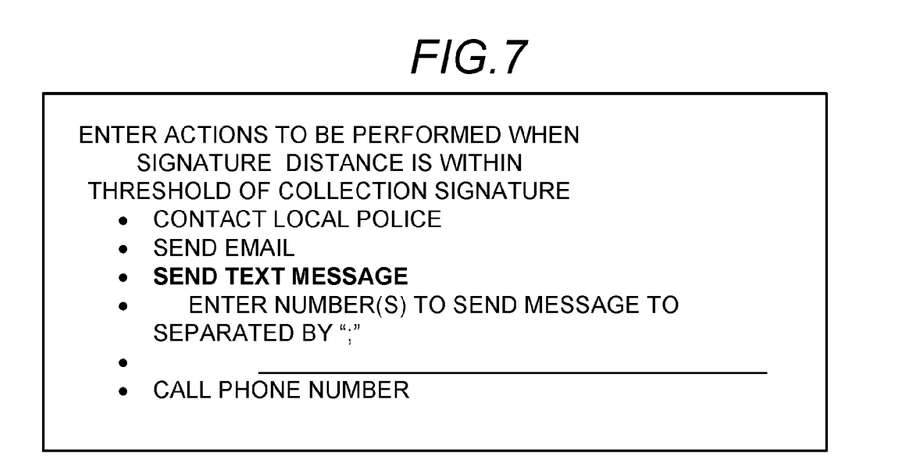

FIG. 7 shows that when the user selects "SEND TEXT MESSAGE", the user is prompted to enter one or more phone numbers to which a text message may be sent.

Figure 8:
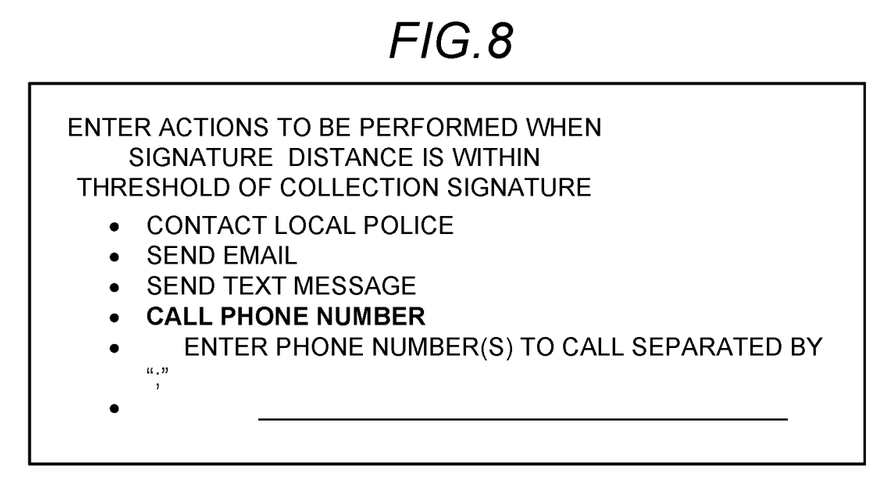

FIG. 8 shows that when the user selects "CALL PHONE NUMBER", the user may be prompted to enter one or more phone numbers which will be called with a message indicating that an unstructured text document was found to have a signature within a threshold distance of the signature of at least one collection.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The invention claimed is:

1. A computer-implemented method comprising:
   selecting, via at least one processing device, each text file from a collection of text files, wherein the collection of text files have an intensity with respect to negative sentiment toward a common issue;
   performing, for each text file, by the at least one processing device, at least one profile algorithm, each calculating a corresponding profile score for that text file;
   combining, by the at least one processing device, at least one corresponding profile score of the text files of the collection to produce a signature for the collection of text files including an aggregated profile score for each of the at least one profile algorithm;
   storing the aggregated profile score of each of the at least one profile algorithm for the collection;

performing the at least one profile algorithm with respect to a desired text file to calculate a signature for the desired text file, the signature including a corresponding profile score for each of the at least one profile algorithm performed with respect to the desired text file; and performing a user-configured action when the signature of the collection is within a threshold distance of the signature of the desired text file, the user-configured action being a contacting action.

2. The computer-implemented method of claim 1, further comprising:

computing a signature for each of one or more other collections of text files, each of the collections of text files being authored by a respective author and includes a varying intensity.

3. The computer-implemented method of claim 2, wherein at least some of the authors performed a negative act with undesirable impact and are associated with an intensity of the negative sentiment of a corresponding collection.

4. The computer-implemented method of claim 2, further comprising:

calculating a distance between the signature of each of the collection of text files and the signature of the desired text file.

5. The computer-implemented method of claim 4, wherein the distance is based on a Euclidean distance.

6. The computer-implemented method of claim 1, wherein at least one of the at least one profile algorithm includes a first algorithm that calculates a profile score based on use and frequency of use of specific keywords in a text file.

7. At least one processing device, each of the at least one processing device comprising:

at least one processor;
a memory; and
a communication bus connecting the at least one processor with the memory, wherein the memory has stored therein instructions, which when executed by the at least one processor cause the at least one processing device to perform a method comprising:
selecting each text file from a collection of text files, wherein the collection of text files have an intensity with respect to negative sentiment toward a common issue; and
performing for each text file, at least one profile algorithm, each calculating a corresponding profile score for that text file;
combining at least one corresponding profile score of the text files of the collection to produce a signature for the collection of text files including an aggregated profile score for each of the at least one profile algorithm;
storing the aggregated profile score of each of the at least one profile algorithm for the collection;
performing the at least one profile algorithm with respect to a desired text file to calculate a signature for the desired text file, the signature including a corresponding profile score for each of the at least one profile algorithm performed with respect to the desired text file; and
performing a user-configured action when the signature of the collection is within a threshold distance of the signature of the desired text file, the user-configured action being a contacting action.

8. The at least one processing device of claim 7, wherein at least one of the at least one profile algorithm includes a first algorithm that calculates a profile score based on use and frequency of use of specific keywords in a text file.

9. The at least one processing device of claim 7, wherein the method further comprises:

computing a signature for each of one or more other collections of text files, each of the collections of text files being authored by a respective author and includes a respective varying intensity.

10. The at least one processing device of claim 9, wherein at least some of the authors performed a negative act with undesirable impact and are associated with an intensity of negative sentiment of a corresponding collection.

11. The at least one processing device of claim 9, further comprising:

calculating a distance between the signature of each of the collection of text files and the signature of the desired text file.

12. The at least one processing device of claim 11, wherein the distance is based on a Euclidean distance.

13. A computer program product comprising:

a computer readable storage medium having computer readable program code embodied therewith for execution on a processing system, the computer readable program code being configured to be executed by the processing system to:
select each text file from a collection of text files, wherein the collection of text files have an intensity with respect to negative sentiment toward a common issue;
perform for each text file at least one profile algorithm, each calculating a corresponding profile score for that text file;
combine at least one corresponding profile score of the text files of the collection to produce a signature for the collection of text files including an aggregated profile score for each of the at least one profile algorithm;
store the aggregated profile score for each of the at least one profile algorithm for the collection;
perform the at least one profile algorithm with respect to a desired text file to calculate a signature for the desired text file, the signature including a corresponding profile score for each of the at least one profile algorithm performed with respect to the desired text file; and
performing a user-configured action when the signature of the collection is within a threshold distance of the signature of the desired text file, the user-configured action being a contacting action.

14. The computer program product of claim 13, wherein the computer readable program code is further configured to be executed by the processing system to:

compute a signature for each of one or more other collections of text files, each of the collections of text files being authored by a respective author and includes a respective varying intensity.

15. The computer program product of claim 14, wherein at least some of the authors performed a negative act with undesirable impact and are associated with an intensity of the negative sentiment of a corresponding collection.

16. The computer program product of claim 14, further comprising:

calculating a distance between the signature of each of the collection of text files and the signature of the desired text file.

17. The computer program product of claim 16, wherein the distance is based on a Euclidean distance.

* * * * *